United States Patent [19]

Nanya et al.

[11] Patent Number: 5,085,965
[45] Date of Patent: Feb. 4, 1992

[54] NEGATIVE TONER FOR DEVELOPING LATENT ELECTROSTATIC IMAGES

[75] Inventors: Toshiki Nanya, Mishima; Kimitoshi Yamaguchi, Numazu; Kazuo Tsubuko, Numazu; Toshihiko Takahashi, Numazu; Hiromitsu Kawase, Numazu; Makoto Ookawara, Tokyo, all of Japan

[73] Assignee: Ricoh Company, Ltd., Tokyo, Japan

[21] Appl. No.: 496,210

[22] Filed: Mar. 20, 1990

[30] Foreign Application Priority Data

Mar. 27, 1989 [JP] Japan .................................. 1-074558

[51] Int. Cl.$^5$ ............................................. G03G 9/087
[52] U.S. Cl. ........................................ 430/109; 430/108
[58] Field of Search ................ 430/110, 903, 109, 108

[56] References Cited

U.S. PATENT DOCUMENTS 4,882,258 11/1989 Ikeuchi et al. ...................... 430/110

*Primary Examiner*—John Goodrow
*Attorney, Agent, or Firm*—Cooper & Dunham

[57] ABSTRACT

A negatively chargeable toner for developing latent electrostatic images comprising a coloring agent, a resin component which comprises a homopolymer of a first monomer having formula (I) or a copolymer of the aforementioned first monomer and a second monomer:

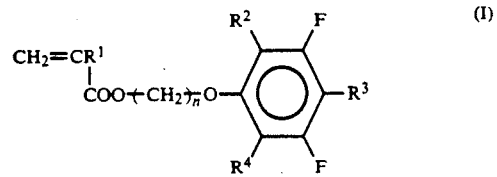

wherein $R^1$ represents —H or —CH$_3$; $R^2$ and $R^3$ each represent —CN, —COOH or —NO$_2$; $R^4$ represents —F, —Cl or —Br; and n is an integer of 1 to 10.

29 Claims, 1 Drawing Sheet

FIGURE
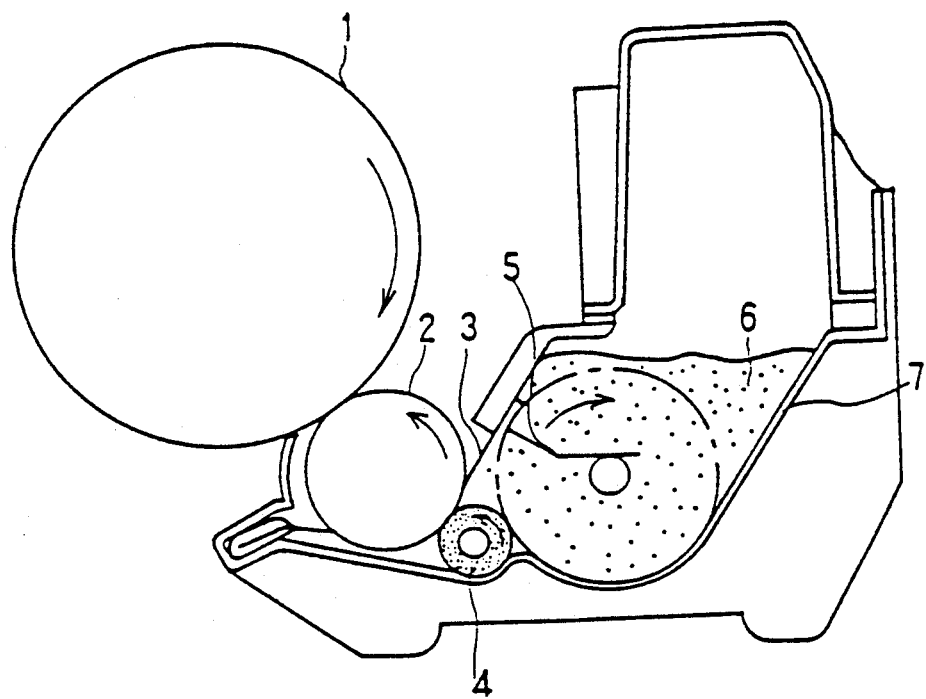

NEGATIVE TONER FOR DEVELOPING LATENT ELECTROSTATIC IMAGES

BACKGROUND OF THE INVENTION

1. Field of the Invention

The present invention relates to a toner for developing latent electrostatic images. In particular, it is concerned with a negatively chargeable toner used in the field of electrophotography and electrostatic printing.

2. Discussion of Background

For developing latent electrostatic images to visible images there are two types of a developer, as conventionally disclosed in Japanese Laid-Open Patent Application 61-147261. One is a two-component type developer prepared by mixing toner and carrier particles, and the other is a one-component type developer which is obtained by dispersing a coloring agent such as a dye and a pigment in a binder resin without using carrier particles.

In the aforementioned two-component type developer, toner particles and carrier particles are electrically charged to different polarities in the course of stirring in a development unit, and the toner particles are attracted to latent electrostatic images which are charged to an opposite polarity to that of the toner particles and visible toner images can be thus obtained. The method of developing latent electrostatic images to visible toner images varies depending on the types of the employed carrier particles. For example, in the magnetic brush development, toner particles are mixed together with iron powders serving as carrier particles, and in the cascade development, toner particles are attracted to the surfaces of glass beads serving as carrier particles by the aid of a triboelectric effect. In addition, fur brush development can be carried out by using a fur brush instead of carrier particles.

In the case of a one-component type developer, various development methods are also proposed. For example, powder cloud development, one of the aerosol development methods, is conducted by spraying the one-component type developer to a transfer sheet bearing latent electrostatic images; and contact development, also referred to as touch down development, is conducted in such a manner that toner particles are directly brought into contact with latent electrostatic images. There is also proposed an induction development, in which magnetic electroconductive toner particles are brought into contact with latent electrostatic images.

The toner particles applicable for the above-mentioned development methods are prepared by dispersing a coloring agent such as carbon black in a binder resin such as natural resins and synthetic resins. More specifically, a coloring agent is dispersed in a binder resin such as polystyrene, the resulting dispersion is cooled to room temperature to prepare a solid material, and then it is pulverized until a particle diameter thereof will attain to 1 to 30 $\mu$m. Furthermore, by adding a magnetic material such as magnetite to the above-mentioned coloring agent and binder resin, a magnetic toner can be obtained.

As previously mentioned, toner particles applicable for various development methods are electrically charged to a positive or negative polarity depending on the polarity of the latent electrostatic image. Toner particles can be provided with the electric charge by means of the triboelectric characteristics of a resin component contained therein. In such a case, however, the chargeability of toner particles is not so sufficient that the fogging will easily occur on the obtained images, which deteriorates the sharpness of images.

To give the desired chargeability to toner particles, a dye or pigment capable of providing toner particles with electric charge, or a charge controlling agent is generally added to toner particles.

For charge controlling agents which apply a negative charge to the toner, metal complex salts of monoazo dye; nitrofumic acid and salts thereof; Co, Cr and Fe metal complexes containing salicylic acid, naphthoic acid or dicarboxylic acid; sulfonated copper phthalocyanine pigment; a nitro group- or halogen-introduced styrene oligomer; chlorinated paraffin; and melamine resin can be employed.

However, the above-mentioned dyes capable of applying a negative charge to the toner have the shortcomings that their structures are complicated and characteristics are unstable, so that the stability cannot be ensured as the charge controlling agent. In addition to this, they are easily decomposed while kneaded with application of heat thereto, and decomposed or deteriorated by mechanical shocks, frictions, and changes in temperature and humidity conditions. This will be accompanied by the deterioration of charge controllability. Some of the above dyes serving as charge controlling agent may change their charge controlling performance in accordance with the environment.

Furthermore, when toner particles containing the conventional charge controlling agents are practically used for a long period of time, the charge controlling agents are separated from the toner particles due to the friction between toner particles and between the toner particles and the surface of a photoconductor, and the collision of the toner particles with carrier particles. The charge controlling agents which have been separated from the toner are deposited to the surface of the photoconductor, with the result that a so-called toner-filming phenomenon takes place.

SUMMARY OF THE INVENTION

Accordingly, an object of the present invention is to provide a negatively chargeable toner for developing latent electrostatic images, which is capable of (a) keeping the triboelectric performance constant between toner particles and between toner particles and carrier particles, or between toner particles and charge application members such as a development sleeve and a development blade in the case where a one-component type developer is used; (b) producing sharp and even distribution of the amount of the triboelectric charge; and (c) controlling the chargeability to the employed development system.

A second object of the present invention is to provide a negatively chargeable toner for developing latent electrostatic images, capable of yielding clear color images without deposition or stain of toner particles of the background of copying paper, and capable of yielding clear images without the decrease in image fidelity during the repeated operation.

The above-mentioned objects of the present invention can be achieved by a negatively chargeable toner for developing latent electrostatic images comprising a coloring agent and a resin component which comprises a homopolymer of a first monomer of formula (I) or a copolymer of the above first monomer and a second monomer:

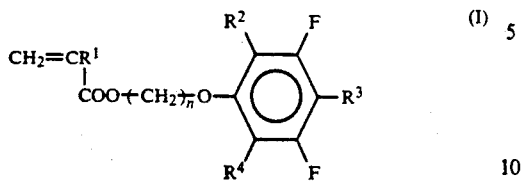

wherein $R^1$ represents -H or -$CH_3$; $R^2$ and $R^3$ each represent -CN, -COOH or -$NO_2$; $R^4$ represents -F, -Cl or -Br; and n is an integer of 1 to 10.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein;

The single FIGURE is a schematic cross-sectional view of a development unit for use in the present invention.

DETAILED DESCRIPTION OF THE PREFERRED EMBODIMENTS

A negatively chargeable toner for developing latent electrostatic images according to the present invention comprises a coloring agent, a resin component which comprises a homopolymer of a first monomer represented by the following formula (I) or a copolymer of the aforementioned first monomer and a second monomer:

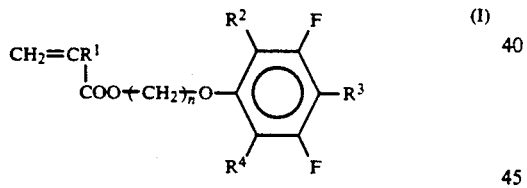

wherein $R^1$ represents -H or -$CH_3$; $R^2$ and $R^3$ each represent -CN, -COOH or -$NO_2$; $R^4$ represents -F, -Cl or -Br; and n is an integer of 1 to 10.

Specific examples of the above-mentioned first monomer having formula (I) for use in the present invention are as follows:

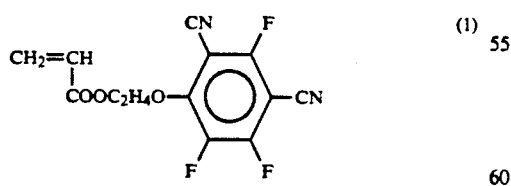

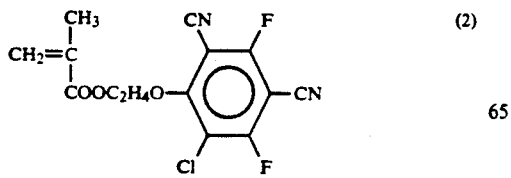

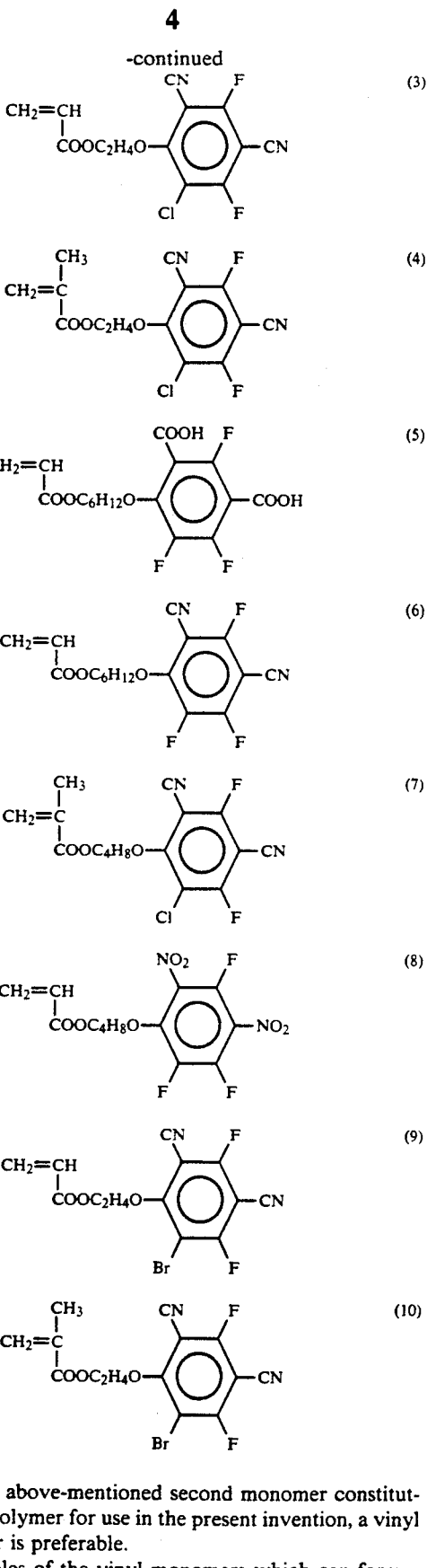

As the above-mentioned second monomer constituting a copolymer for use in the present invention, a vinyl monomer is preferable.

Examples of the vinyl monomers which can form a copolymer in combination with the above-mentioned monomers having formula (I) styrene, α-methylstyrene, methylstyrene, alkyl acrylate, alkyl methacrylate, acrylonitrile, methacrylonitrile, vinyl acetate and vinylpyridine.

When the resin component of the toner according to the present invention comprises a copolymer of the aforementioned first monomer of formula (I) and the vinyl monomer, it is preferable that the polymerization ratio of the first monomer of formula (I) to the vinyl monomer be in the range of 100:0 to 5:95 in terms of parts by weight.

It is preferable that the weight-average molecular weight of the thus obtained homopolymer or copolymer for use in the resin component be in the range of 5,000 to 100,000, more preferably 8,000 to 30,000.

The present invention will now be explained in detail by referring to synthesis examples of the above-mentioned homopolymers of the first monomer having formula (I) or copolymers of the above first monomer and the vinyl monomer. All the values for the weight-average molecular weight (Mw) as described in the synthesis examples are values measured by gel permeation chromatography (GPC).

SYNTHESIS EXAMPLE 1

An equipment for polymerization was prepared by placing a 2-l four-necked flask equipped with a thermometer, a stirring mill and a cooling tube in an oil bath for temperature control. 500 g of toluene was put into the above prepared flask and heated to 85° C.

A mixture of 500 g of the above listed monomer (1) for use in the present invention and 8 g of azobisisobutyronitrile (AIBN) was added to the above-mentioned toluene dropwise using a dropping funnel over a period of 1.5 hours. After the completion of dropping, the monomer was stirred at 85° C. for 6 hours and the polymerization was thus completed.

The resulting polymeric product was purified by using a mixed solution of ethanol and hexane (1:2) and dried, so that a desired polymeric product having a weight-average molecular weight (Mw) of 14,000 was obtained at a polymerization rate of 92%.

SYNTHESIS EXAMPLE 2

An equipment for polymerization was prepared by placing a 2-l four-necked flask equipped with a thermometer, a stirring mill and a cooling tube in an oil bath for temperature control. 500 g of toluene was put into the above prepared flask and heated to 85° C.

A mixture of 150 g of the above listed monomer (1) for use in the present invention, 350 g of 2-ethylhexyl acrylate (2EHA) and 10 g of azobisisobutyronitrile (AIBN) was added to the above-mentioned toluene dropwise using a dropping funnel over a period of 1.5 hours. After the completion of dropping, the monomer was stirred at 85° C. for 6 hours and the polymerization was thus completed.

The resulting polymeric product was purified by using a mixed solution of ethanol and hexane (1:2) and dried, so that a desired polymeric product having a weight-average molecular weight (Mw) of 12,000 was obtained at a polymerization rate of 90%.

SYNTHESIS EXAMPLE 3

An equipment for polymerization was prepared by placing a 2-l four-necked flask equipped with a thermometer, a stirring mill and a cooling tube in an oil bath for temperature control. 500 g of toluene was put into the above prepared flask and heated to 85° C.

A mixture of 100 g of the above listed monomer (1) for use in the present invention, 400 g of styrene and 10 g of azobisisobutyronitrile (AIBN) was added to the abovementioned toluene dropwise using a dropping funnel over a period of 1.5 hours. After the completion of dropping, the monomer was stirred at 85° C. for 6 hours and the polymerization was thus completed.

The resulting polymeric product was purified by using a mixed solution of ethanol and hexane (1:2) and dried, so that a desired polymeric product having a weight-average molecular weight (Mw) of 15,000 was obtained at a polymerization rate of 94%.

SYNTHESIS EXAMPLE 4

An equipment for polymerization was prepared by placing a 2-l four-necked flask equipped with a thermometer, a stirring mill and a cooling tube in an oil bath for temperature control. 500 g of toluene was put into the above prepared flask and heated to 85° C.

A mixture of 500 g of the above listed monomer (2) for use in the present invention and 8 g of azobisisobutyro nitrile (AIBN) was added to the abovementioned toluene dropwise using a dropping funnel over a period of 1.5 hours. After the completion of dropping, the monomer was stirred at 85° C. for 6 hours and the polymerization was thus completed.

The resulting polymeric product was purified by using a mixed solution of ethanol and hexane (1:2) and dried, so that a desired polymeric product having a weight-average molecular weight (Mw) of 16,500 was obtained at a polymerization rate of 92%.

SYNTHESIS EXAMPLE 5

An equipment for polymerization was prepared by placing a 2-l four-necked flask equipped with a thermometer, a stirring mill and a cooling tube in an oil bath for temperature control. 500 g of toluene was put into the above prepared flask and heated to 85° C.

A mixture of 150 g of the above listed monomer (2) for use in the present invention, 350 g of 2-ethylhexyl acrylate (2EHA) and 10 g of azobisisobutyronitrile (AIBN) was added to the above-mentioned toluene dropwise using a dropping funnel over a period of 1.5 hours. After the completion of dropping, the monomer was stirred at 85° C. for 6 hours and the polymerization was thus completed.

The resulting polymeric product was purified by using a mixed solution of ethanol and hexane (1:2) and dried, so that a desired polymeric product having a weight-average molecular weight (Mw) of 13,500 was obtained at a polymerization rate of 88%.

SYNTHESIS EXAMPLE 6

An equipment for polymerization was prepared by placing a 2-l four-necked flask equipped with a thermometer, a stirring mill and a cooling tube in an oil bath for temperature control. 500 g of toluene was put into the above prepared flask and heated to 85° C.

A mixture of 250 g of the above listed monomer (7) for use in the present invention and 250 g of ethyl acrylate was added to the above-mentioned toluene dropwise using a dropping funnel over a period of 1.5 hours. After the completion of dropping, the monomer was stirred at 85° C. for 6 hours and the polymerization was thus completed.

The resulting polymeric product was purified by using a mixed solution of ethanol and hexane (1:2) and dried, so that a desired polymeric product having a weight-average molecular weight (Mw) of 7,500 was obtained at a polymerization rate of 85%.

SYNTHESIS EXAMPLE 7

An equipment for polymerization was prepared by placing a 2-l four-necked flask equipped with a thermometer, a stirring mill and a cooling tube in an oil bath for temperature control. 500 g of toluene was put into the above prepared flask and heated to 85° C.

A mixture of 100 g of the above listed monomer (3) for use in the present invention and 400 g of styrene was added to the above-mentioned toluene dropwise using a dropping funnel over a period of 1.5 hours. After the completion of dropping, the monomer was stirred at 85° C. for 6 hours and the polymerization was thus completed.

The resulting polymeric product was purified by using a mixed solution of ethanol and hexane (1:2) and dried, so that a desired polymeric product having a weight-average molecular weight (Mw) of 9,200 was obtained at a polymerization rate of 80%.

SYNTHESIS EXAMPLE 8

An equipment for polymerization was prepared by placing a 2-l four-necked flask equipped with a thermometer, a stirring mill and a cooling tube in an oil bath for temperature control. 500 g of toluene was put into the above prepared flask and heated to 85° C.

A mixture of 400 g of the above listed monomer (6) for use in the present invention and 100 g of butyl acrylate was added to the above-mentioned toluene dropwise using a dropping funnel over a period of 1.5 hours. After the completion of dropping, the monomer was stirred at 85° C. for 6 hours and the polymerization was thus completed.

The resulting polymeric product was purified by using a mixed solution of ethanol and hexane (1:2) and dried, so that a desired polymeric product having a weight-average molecular weight (Mw) of 6,400 was obtained at a polymerization rate of 60%.

As previously mentioned, the toner according to the present invention comprises a resin component which comprises a homopolymer of the first monomer of formula (I) or a copolymer of the above first monomer of formula (I) and the second monomer. The above homopolymer or copolymer also functions as a charge controlling agent in the negatively chargeable toner according to the present invention.

In the present invention, the above homopolymer or copolymer can be used alone as a resin component of the toner. However, it is preferable that the homopolymer or copolymer be used in combination with other resins showing good compatibility therewith as a resin component of the toner according to the present invention. Such resins may be selected from resins which are conventionally known as a resin for the toner. For example, homopolymers of styrene and styrene derivatives such as polystyrene, poly-p-chlorostyrene and polyvinyl toluene; styrene copolymers such as styrene-p-chlorostyrene copolymer, styrene - propylene copolymer, styrene - vinyltoluene copolymer, styrene - vinylnaphthalene copolymer, styrene - methyl acrylate copolymer, styrene - ethyl acrylate copolymer, styrene - butyl acrylate copolymer, styrene - octyl acrylate copolymer, styrene - methyl methacrylate copolymer, styrene - ethyl methacrylate copolymer, styrene - butyl methacrylate copolymer, styrene - methyl α-chloromethacrylate copolymer, styrene acrylonitrile copolymer, styrene - vinylmethyl ether copolymer, styrene - vinylethyl ether copolymer, styrene -vinylmethylketone copolymer, styrene - butadiene copolymer, styrene - isoprene copolymer, styrene - acrylonitrile -indene copolymer, styrene - maleic acid copolymer and styrene - maleate copolymer; and other resins such as polymethyl methacrylate, polybutyl methacrylate, polyvinyl chloride, polyethylene, polypropylene, polyester, polyurethane, polyamide, epoxy resin, polyvinyl butyral, polyacrylic acid resin, rosin, modified rosin, terpene resin, phenolic resin, aliphatic hydrocarbon resin, alicyclic hydrocarbon resin, aromatic petroleum resin, chlorinated paraffin and paraffin wax can be employed. Those can be used alone or in combination.

In particular, when a toner image formed on a transfer sheet is fixed with application of pressure thereto, preferable examples of the binder resin are as follows: polyolefin such as low molecular weight polyethylene, low molecular weight polypropylene, polyethylene oxide and polyethylene tetrafluoride; epoxy resin; polyester resin; styrene - butadiene copolymer (monomer ratio of 5 to 30:95 to 70); olefin copolymer such as ethylene - acrylic acid copolymer, ethylene - acrylate copolymer, ethylene - methacrylic acid copolymer, ethylene - methacrylate copolymer, ethylene - vinyl chloride copolymer, ethylene - vinyl acetate copolymer and ionomer resin; polyvinyl pyrrolidone; methyl vinyl ether - maleic anhydride copolymer; maleic acid modified phenolic resin and phenol modified terpene resin. Those can be used alone or in combination.

It is preferable that the amount of the homopolymer of the first monomer having formula (I) or the copolymer of the first monomer having formula (I) and the second monomer be in the range of 0.5 to 20 wt. % to the total amount of the resin component contained in the toner.

For the coloring agent for use in the present invention, any conventional dyes and pigments can be employed. Specific examples of the coloring agent are carbon black, lamp black, black iron oxide, ultramarine blue, nigrosine dye, aniline blue, phthalocyanine blue, phthalocyanine green, Hansa yellow G, rhodamine 6G lake, Calconyl Blue, chrome yellow, quinacridone, benzidine yellow, Rose Bengale, triallylmethane-type dyes, monoazo-type dyes and pigments, and disazo-type dyes and pigments. The above-mentioned conventional dyes and pigments can be used alone or in combination.

The toner according to the present invention basically comprises a coloring agent and a resin component which comprises a homopolymer having a first monomer represented, by the above-mentioned formula (I) or a copolymer of the aforementioned first monomer and a second monomer. Furthermore, characteristics modifying agents which are conventionally known may be added to the formulation of the toner according to the present invention.

The negatively chargeable toner particles according to the present invention can be prepared in such a manner that a mixture of the above-mentioned components is kneaded at a temperature where the resin component therein is readily melted, and cooled to room temperature. The thus kneaded mixture is pulverized and classified, so that toner particles having an average particle diameter of about 5 to 25 μm can be obtained.

The toner according to the present invention can be used as a magnetic one-component type toner by adding a magnetic material in the form of finely-divided particles to the toner particles. Examples of the magnetic material contained in the toner particles according to the present invention are iron oxides such as magnetite, hematite and ferrite; metals such as iron, cobalt and nickel; alloys of the above-mentioned ferromagnetic metals and the following metals such as aluminum, cobalt, copper, lead, magnesium, tin, zinc, antimony, beryllium, bismuth, cadmium, calcium, manganese, selenium, titanium, tungsten and vanadium; and mixtures thereof. It is preferable that the average particle diameter of the above-mentioned magnetic material be about 0.1 to 2 μm.

The amount of the above magnetic material is preferably in the range of about 20 to 200 parts by weight, and more preferably in the range of about 40 to 150 parts by weight to 100 parts by weight of a resin component.

The toner according to the present invention is used as a one-component type developer in a development unit as shown in the single FIGURE. In the development unit in the single FIGURE, a toner 6 accumulated in a toner reservoir 7 is forcibly brought onto a sponge roller 4 by a stirring blade 5, so that the toner 6 is supplied onto the sponge roller 4. As the sponge roller 4 is rotated in a direction of the arrow, the toner 6 fed to the sponge roller 4 is transported onto a toner transportation member 2, where the toner 6 is frictioned, and electrostatically or physically attracted to the toner transportation member 2. As the toner transportation member 2 is rotated in a direction of the arrow, a uniformly thin layer of the toner 6 is formed on the toner transportation member 2 by an elastic blade 3. At the same time, the thin layer of the toner 6 is tribo-electrically charged. The toner 6 is then transported onto the surface of a latent electrostatic image bearing member 1 which is situated in contact with or adjacent to the toner transportation member 2, so that the latent electrostatic image is developed to a visible toner image.

Furthermore, the toner according to the present invention is advantageous when used as a two-component type developer by blending this toner and carrier particles.

Any conventional carrier particles are available in the present invention. For example, magnetic finely-divided particles such as iron powders, ferrite powders and nickel powders; and glass beads and resin-coated glass beads can be employed as carrier particles.

To the toner particles according to the present invention, finely-divided particles of other auxiliary agents may be added when necessary. For example, there are a lubricant such as finely-divided particles of fluoroplastics and zinc stearate; an abrasive such as cerium oxide and silicon carbide; a fluidity promoting agent or a caking inhibitor such as colloidal silica and aluminum oxide; an electroconductivity-imparting agent such as carbon black and tin oxide; and a fixing performance promoting agent such as low-molecular-weight polyolefin.

Other features of this invention will become apparent in the course of the following description of exemplary embodiments, which are given for illustration of the invention and are not intended to be limiting thereof.

EXAMPLE 1

The following components were mixed and stirred in a Henschel mixer, and then kneaded for about 30 minutes in a roll mill which was heated to 130° C. to 140° C. This mixture was cooled to room temperature, pulverized and classified, so that blue toner No. 1 with a particle diameter of 5 to 20 μm according to the present invention was obtained.

|  | Parts by Weight |
| --- | --- |
| Styrene-n-butyl methacrylate copolymer | 100 |
| Polypropylene | 5 |
| C.I. Pigment Blue 15 | 5 |
| Polymeric product prepared in Synthesis Example 1 | 2 |

2.5 parts by weight of the above prepared toner No. 1 and 97.5 parts by weight of silicone-resin-coated ferrite carrier particles having a particle size of 100 to 250 meshes were mixed in a ball mill, whereby a two-component type developer was obtained.

The thus obtained developer was subjected to an image formation test using a commercially available electrophotographic copying machine, "FT-4060" (Trademark), made by Ricoh Company, Ltd. The initial images obtained by the above test were clear. Even after 200,000 copies were made, the obtained images were still excellent in quality.

The initial charge quantity of the toner, measured by the blow-off method, was $-18.6$ μC/g. After the making of 200,000 copies, the charge quantity of the toner was $-18.1$ μC/g, which was almost the same as the initial charge quantity of the toner.

In addition, under the conditions of high humidity of 90% RH at 35° C., and low humidity of 15% RH at 10° C., the image quality of the obtained images was not deteriorated. The film forming of the toner on the photoconductor was not observed.

COMPARATIVE EXAMPLE 1

The same procedure for preparing the two-component type developer as employed in Example 1 was repeated except that the polymeric product prepared in Synthesis Example 1 in the formulation of the toner in Example 1 was replaced by a commercially available zinc salt of salicylic acid, "E-84" (Trademark), made by Orient Chemical Industries, Ltd., whereby a comparative two-component type developer was obtained.

The thus obtained comparative developer was subjected to the same image formation test as conducted in Example 1. The initial images obtained by the above test were clear free from fogging. After 100,000 copies were made, however, obtained images became unclear and fogging was observed. In addition, there was a film of the toner formed on the photoconductor.

The initial charge quantity of the toner, measured by the blow-off method, was $-12.5$ μC/g. After the making of 100,000 copies, the charge quantity of the toner was decreased to $-5.5$ μC/g.

As a result of the image formation test under the conditions of high humidity of 90% RH at 35° C., the image density of obtained images was as low as 0.95 and images were unclear due to the fogging.

EXAMPLE 2

The following components were mixed and stirred in a Henschel mixer, and then kneaded for about 30 minutes in a roll mill which was heated to 130 to 140° C. This mixture was cooled to room temperature, pulverized and classified, so that red toner No. 2 with a particle diameter of 5 to 20 μm according to the present invention was obtained.

|  | Parts by Weight |
| --- | --- |
| Styrene-n-ethylhexyl acrylate copolymer | 100 |
| Polypropylene | 5 |
| C.I. Pigment Red 57 | 5 |
| C.I. Pigment Red 48 | 3 |
| Polymeric product prepared in Synthesis Example 2 | 5 |

100 parts by weight of the above prepared toner No. 2, 3 parts by weight of silicon carbide having a particle diameter of 2 μm and 0.1 parts by weight of hydrophobic colloidal silica were mixed and stirred in a speed kneader, whereby a one-component type developer was obtained.

The thus obtained developer was subjected to an image formation test using the development unit as shown in the single FIGURE. In this example, an electric charge of −800 volts d.c. was uniformly applied to an organic photoconductor 1, the photoconductor 1 was exposed to a light image to form a latent electrostatic image thereon, and the latent electrostatic image is developed to a visible toner image by the above prepared developer.

The initial images obtained by the above test were clear red. Even after 50,000 copies were made, the obtained images were still excellent in quality.

The initial charge quantity (Q/M) of the toner on the toner transportation member 2 as shown in the single FIGURE, measured by use of a specific charge quantity measuring apparatus, was −11.7 μC/g. In the above specific charge quantity measuring apparatus, the toner particles on the toner transportation member 2 were sucked by a Faraday cage with a filter layer equipped at an outlet thereof, and trapped therein to measure the charge quantity of the toner. After the making of 50,000 copies, the charge quantity of the toner was −10.5 μC/g, which was almost the same as the initial charge quantity of the toner.

In addition, under the conditions of high humidity of 90% RH at 35° C., and low humidity of 15% RH at 10° C., the image quality of the obtained images was not deteriorated. The film forming of the toner on the photoconductor was not observed.

EXAMPLE 3

The following components were mixed and stirred in a Henschel mixer, and then kneaded for about 30 minutes in a roll mill which was heated to 130 to 140° C. This mixture was cooled to room temperature, pulverized and classified, so that green toner No. 3 with a particle diameter of 5 to 20 μm according to the present invention was obtained.

|  | Parts by Weight |
| --- | --- |
| Epoxy resin | 100 |
| Polyethylene | 5 |
| C.I. Pigment Blue 15 | 5 |
| C.I. Pigment Yellow 17 | 5 |
| Polymeric product prepared in Synthesis Example 6 | 3 |

3.5 parts by weight of the above prepared toner No. 3 and 96.5 parts by weight of iron carrier particles having a particle size of 100 to 200 meshes were mixed in a ball mill, whereby a two-component type developer was obtained.

The thus obtained developer was subjected to the same image formation test as conducted in Example 1. The initial images obtained by the above test were clear. Even after 200,000 copies were made, the obtained images were still excellent in quality.

The initial charge quantity of the toner, measured by the blow-off method, was −18.8 μC/g. After the making of 200,000 copies, the charge quantity of the toner was −17.5 μC/g, which was almost the same as the initial charge quantity of the toner.

In addition, under the conditions of high humidity of 90% RH at 35° C., and low humidity of 15% RH at 10° C., the image quality of the obtained images was not deteriorated. The film forming of the toner on the photoconductor was not observed.

COMPARATIVE EXAMPLE 2

The same procedure for preparing the one-component type developer as employed in Example 2 was repeated except that 5 parts by weight of the polymeric product prepared in Synthesis Example 2 in the formulation of the toner in Example 2 was replaced by 1.5 parts by weight of a commercially available metal-containing monoazo dye, "S-34" Trademark), made by Orient Chemical Industries, Ltd., whereby a comparative one-component type developer was obtained.

The thus obtained comparative developer was subjected to the same image formation test as conducted in Example 2. The initial images obtained by the above test were clear free from fogging. After 10,000 copies were made, however, obtained images became unclear and fogging was observed.

The initial charge quantity of the toner, measured by the same method as employed in Example 2, was −9.1 μC/g. After the making of 50,000 copies, the charge quantity of the toner was decreased to −2.5 μC/g.

As a result of the image formation test under the conditions of high humidity of 90% RH at 35° C., the image density of obtained images was as low as 0.86 and images were unclear due to the fogging.

EXAMPLE 4

The following components were mixed and stirred in a Henschel mixer, and then kneaded for about 30 minutes in a roll mill which was heated to 130 to 140° C. This mixture was cooled to room temperature, pulverized and classified, so that black toner No. 4 with a particle diameter of 5 to 25 μm according to the present invention was obtained.

|  | Parts by Weight |
| --- | --- |
| Unsaturated polyester | 100 |
| Polypropylene | 5 |
| Carbon black | 10 |
| Polymeric product prepared in Synthesis Example 4 | 5 |

100 parts by weight of the above prepared toner No. 4, 2.5 parts by weight of silicon carbide having a particle diameter of 2 μm and 0.1 parts by weight of hydrophobic colloidal silica were mixed and stirred in a speed kneader, whereby a one-component type developer was obtained.

The thus obtained developer was subjected to the same image formation test as conducted in Example 2.

The initial images obtained by the above test were clear black. Even after 50,000 copies were made, the obtained images were still excellent in quality.

The initial charge quantity (Q/M) of the toner, measured by use of a specific charge quantity measuring apparatus, was $-10.5$ $\mu C/g$. After the making of 50,000 copies, the charge quantity of the toner was $-9.8$ $\mu C/g$, which was almost the same as the initial charge quantity of the toner.

In addition, under the conditions of high humidity of 90% RH at 35° C., and low humidity of 15% RH at 10° C., the image quality of the obtained images was not deteriorated. The film forming of the toner on the photoconductor was not observed.

EXAMPLES 5 to 8

The same procedure for preparing the two-component type developer as employed in Example 1 was repeated except that the toner composition employed in Example 1 was replaced by the respective toner compositions as shown in Table 1, so that toners No. 5 to No. 8 according to the present invention were obtained.

2.5 parts by weight of each of the toners No. 5 to No. 8 and 97.5 parts by weight of the respective carrier particles as shown in Table 1 were mixed in a ball mill, whereby two-component type developers were separately obtained.

The thus obtained developers were subjected to the same image formation test as conducted in Example 1. The results are given in Table 1.

or a copolymer of the above first monomer having formula (I) and the second monomer, which homopolymer or copolymer functions as both a charge controlling agent and a binder agent. As a result, the negatively chargeable triboelectric performance of toner can be kept constant, and the image quality is scarcely deteriorated even after repeated copying operations.

In addition to the above, the toner according to the present invention is superior to conventional toners in the dispersibility of the above homopolymer or copolymer in the binder resin. Accordingly, the environmental stability of the toner according to the present invention is excellent and it can produce a clear color image.

What is claimed is:

1. A negatively chargeable toner for developing latent electrostatic images comprising a coloring agent and a resin component which comprises a homopolymer of a first monomer of formula (I) or a copolymer of said first monomer and a second monomer:

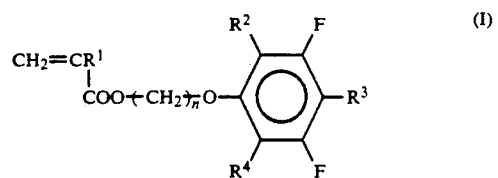

wherein $R^1$ represents -H or -CH; $R^2$ and $R^3$ each represent -CN, -COOH or -NO$_2$; $R^4$ represents -F, -Cl or -Br;

TABLE 1

| Example No. | Formulation of Developer | | Image Quality | | Charge Quantity of Toner [μC/g] | |
|---|---|---|---|---|---|---|
| | Toner Composition | Parts by Weight | Initial Stage | After 200,000 copies | Initial Stage | After 200,000 copies |
| 5 | Polyethylene wax | 62 | Clear blue | Almost the same as that in initial Stage | −20.3 | −19.2 |
| | Ethylene-vinyl acetate copolymer | 40 | | | | |
| | C.I. Pigment Blue 15 | 4 | | | | |
| | Polymeric product in Synthesis Example 1 | 2 | | | | |
| | Carrier Composition | | | | | |
| | Silicone-resin-coated ferrite | | | | | |
| 6 | Polyester resin | 75 | Clear black | Same as the above | −22.1 | −21.6 |
| | Polypropylene | 5 | | | | |
| | Carbon black | 10 | | | | |
| | Polymeric product in Synthesis Example 3 | 4 | | | | |
| | Carrier Composition | | | | | |
| | Iron oxide powder | | | | | |
| 7 | Styrene-n-butyl acrylate copolymer | 80 | Clear yellow | Same as the above | −24.1 | −22.5 |
| | Polyethylene | 10 | | | | |
| | C.I. Disperse Yellow 33 | 5 | | | | |
| | Polymeric product in Synthesis Example 7 | 5 | | | | |
| | Carrier Composition | | | | | |
| | Silicone-resin-coated ferrite | | | | | |
| 8 | Styrene-n-butyl acrylate copolymer | 83.5 | Clear green | Same as the above | −19.5 | −18.2 |
| | Polypropylene | 5 | | | | |
| | C.I. Pigment Blue 15 | 5 | | | | |
| | C.I. Pigment Yellow 17 | 3 | | | | |
| | Polymeric product in Synthesis Example 8 | 3.5 | | | | |
| | Carrier Composition | | | | | |
| | Iron oxide powder | | | | | |

The toners for developing a latent electrostatic image to a visible toner image according to the present invention comprises a resin component which comprises a homopolymer of the first monomer having formula (I) and n is an integer of 1 to 10.

2. The negatively chargeable toner as claimed in claim 1, wherein said second monomer is a vinyl monomer.

3. The negatively chargeable toner as claimed in claim 2, wherein said vinyl monomer is selected from the group consisting of styrene, α-methylstyrene, methylstyrene, alkyl acrylate, alkyl methacrylate, acrylonitrile, methacrylonitrile, vinyl acetate and vinylpyridine.

4. The negatively chargeable toner as claimed in claim 1, wherein said monomer is represented by the following formula:

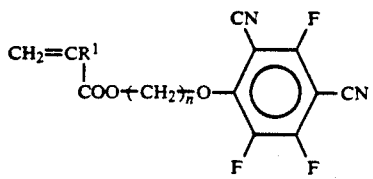

wherein $R^1$ represents -H or -$CH_3$; and n is an integer of 1 to 10.

5. The negatively chargeable toner as claimed in claim 4, wherein said monomer has a structure selected from the group consisting of:

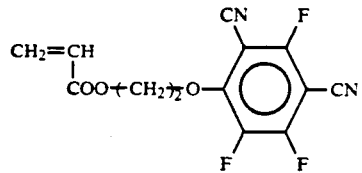

and

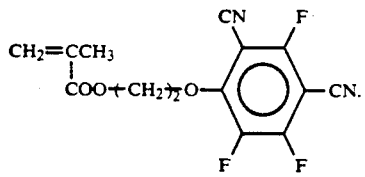

6. The negatively chargeable toner as claimed in claim 1, wherein said homopolymer or copolymer has a weight-average molecular weight ranging from 5,000 to 100,000.

7. The negatively chargeable toner as claimed in claim 6, wherein said homopolymer or copolymer has a weight-average molecular weight ranging from 8,000 to 30,000.

8. The negatively chargeable toner as claimed in claim 1, wherein the amount of said homopolymer or copolymer is in the range of 0.5 to 20 wt. % of the total amount of said resin component.

9. The negatively chargeable toner as claimed in claim 1, wherein said resin component comprises at least one resin selected from the group consisting of polystyrene, acrylic resin, styrene - acrylic copolymer, polyester, epoxy resin and polyolefin.

10. The negatively chargeable toner as claimed in claim 1, wherein said resin component comprises (a) one resin selected from the group consisting of polystyrene, acrylic resin, styrene - acrylic copolymer and epoxy resin, and (b) a low molecular weight polyolefin.

11. The negatively chargeable toner as claimed in claim 1, further comprising a magnetic material in the toner particles thereof.

12. The negatively chargeable toner as claimed in claim 11, wherein the amount of said magnetic material is in the range of 40 to 150 parts by weight to 100 parts by weight of said resin component.

13. The negatively chargeable toner as claimed in claim 1, further comprising a lubricant, an abrasive, a fluidity providing agent, an electroconductivity-imparting agent and a fixing performance promoting agent in the toner particles thereof or at the surfaces thereof.

14. The negatively chargeable toner as claimed in claim 1, further comprising at least one additive selected from the group consisting of fluoroplastics powder, zinc stearate powder, cerium oxide powder, silicon carbide powder, colloidal silica, aluminum oxide powder, carbon black and tin oxide powder in the toner particles thereof or at the surfaces thereof.

15. The negatively chargeable toner as claimed in claim 1, wherein said coloring agent is selected form the group consisting of yellow-type coloring agents, magenta-type coloring agents and cyan-type coloring agents.

16. A two-component type developer for developing latent electrostatic images comprising (i) toner particles which comprise a coloring agent and a resin component which comprises a homopolymer of a first monomer having formula (I) or a copolymer of said first monomer and a second monomer;

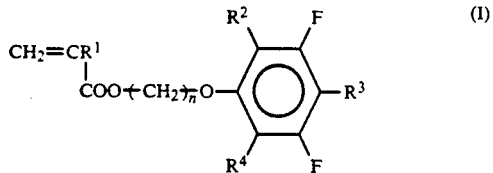

wherein $R^1$ represents -H or -$CH_3$; $R^2$ and $R^3$ each represent -CN, -COOH or -$NO_2$; $R^4$ represents -F, -Cl or -Br; and n is an integer of 1 to 10; and (ii) carrier particles.

17. The two-component type developer as claimed in claim 16, wherein said carrier particles have magnetic properties.

18. The two-component type developer as claimed in claim 16, wherein said second monomer is a vinyl monomer.

19. The two-component type developer as claimed in claim 18, wherein said vinyl monomer is selected from the group consisting of styrene, α-methylstyrene, methylstyrene, alkyl acrylate, alkyl methacrylate, acrylonitrile, methacrylonitrile, vinyl acetate and vinylpyridine.

20. The two-component type developer as claimed in claim 16, wherein said monomer is represented by the following formula:

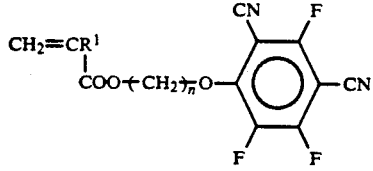

wherein $R^1$ represents -H or -$CH_3$; and n is an integer of 1 to 10.

21. The two-component type developer as claimed in claim 20, wherein said monomer has a structure selected from the group consisting of:

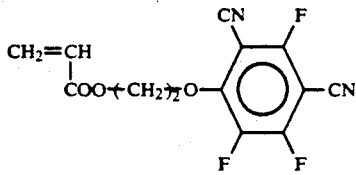

and

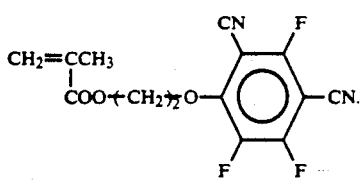

22. The two-component type developer as claimed in claim 16, wherein said homopolymer or copolymer has a weight-average molecular weight ranging from 5,000 to 100,000.

23. The two-component type developer as claimed in claim 22, wherein said homopolymer or copolymer has a weight-average molecular weight ranging from 8,000 to 30,000.

24. The two-component type developer as claimed in claim 16, wherein the amount of said homopolymer or copolymer is in the range of 0.5 to 20 wt. % of the total amount of said resin component.

25. The two-component type developer as claimed in claim 16, wherein said resin component comprises at least one resin selected from the group consisting of polystyrene, acrylic resin, styrene - acrylic copolymer, polyester, epoxy resin and polyolefin.

26. The two-component type developer as claimed in claim 16, wherein said resin component comprises (a) one resin selected from the group consisting of polystyrene, acrylic resin, styrene - acrylic copolymer and epoxy resin, and (b) a low molecular weight polyolefin.

27. The two-component type developer as claimed in claim 16, further comprising a lubricant, an abrasive, a fluidity providing agent, an electroconductivity-imparting agent and a fixing performance promoting agent in said toner particles thereof or at the surfaces thereof.

28. The two-component type developer as claimed in claim 16, further comprising at least one additive selected from the group consisting of fluoroplastics powder, zinc stearate powder, cerium oxide powder, silicon carbide powder, colloidal silica, aluminum oxide powder, carbon black and tin oxide powder in said toner particles thereof or at the surfaces thereof.

29. The two-component type developer as claimed in claim 16, wherein said coloring agent is selected form the group consisting of yellow-type coloring agents, magenta-type coloring agents and cyan-type coloring agents.

* * * * *